US00RE37030E

(19) United States
(12) Reissued Patent
Lloyd et al.

(10) Patent Number: US RE37,030 E
(45) Date of Reissued Patent: Jan. 30, 2001

(54) TOUCH PROBE AND SIGNAL PROCESSING CIRCUIT THEREFOR

(75) Inventors: Peter G. Lloyd, Bristol; Peter K. Hellier, North Nibley; David R. McMurtry, Wotton-Under-Edge, all of (GB)

(73) Assignee: Renishaw PLC, Gloucestershire (GB)

(21) Appl. No.: 08/900,447

(22) Filed: Jul. 25, 1997

Related U.S. Patent Documents

Reissue of:
(64) Patent No.: 5,435,072
Issued: Jul. 25, 1995
Appl. No.: 08/167,027
Filed: Dec. 16, 1993

(30) Foreign Application Priority Data

Dec. 24, 1992 (GB) ..... 9226934
Jan. 29, 1993 (GB) ..... 9301822

(51) Int. Cl.[7] ..... G01B 7/28
(52) U.S. Cl. ..... 33/559; 33/561
(58) Field of Search ..... 33/559, 555, 556, 33/558, 561, DIG. 3, DIG. 13

(56) References Cited

U.S. PATENT DOCUMENTS 4,153,998 * 5/1979 McMurtry .
4,177,568 * 12/1979 Werner et al. .
4,364,180 * 12/1982 Willhelm et al. .
4,455,755 * 6/1984 Fritsche et al. .
4,702,013 * 10/1987 McMurtry et al. ..... 33/558

(List continued on next page.)

FOREIGN PATENT DOCUMENTS

0242747 * 10/1987 (EP) .
0301390 * 2/1989 (EP) .
0420416 * 4/1991 (EP) .
0 420 305 A2 4/1991 (EP) .
501680 A1 9/1992 (EP) .

(List continued on next page.)

OTHER PUBLICATIONS

Offenkundige Vorbenutzung durch Verkauf von Koordinatenmessgeräten vom Typ PMC durch Carl Zeiss in 73446 Oberkochen, (Date unknown).
Kopie eines 1990 erstellten Prospektes für unsere Koordinatenmessgeräten von Typ PMC.
Kopie des gesamten Kapitels 3 unseres Servicehandbuches "Service Handbuch KMG Komponenten 1" aus dem Jahre 1989.
Kopie der Seite 2–3 aus Kapitel 3.3 aus der oben genannten Entgegenhaltung E2b, auf der wir handschriftlich Bezeichnungen eingefügt haben, (Date unknown).
Kopie der Seite 2–1 im Kapitel 3.2 aus der oben genannten Entgegenhaltung E2b, auf der wir handschriftlich Bezeichnungen eingef ügthaben, (Date unknown).

(List continued on next page.)

*Primary Examiner*—Christopher W. Fulton
(74) *Attorney, Agent, or Firm*—Oliff & Berridge, PLC.

(57) ABSTRACT

A touch trigger probe incorporates piezoelectric sensors 50, whose outputs are processed by an interface circuit. The interface circuit discriminates between signals generated from the piezoelectric sensors 50 as a result of machine vibration and those generated as a result of a genuine measurement event, by the use of a timing circuit 90. The timing circuit 90 compares the time intervals $(t_1–t_2);(t_2–t_3)$ between attainment of first $\mathbf{1}_1$ and second $\mathbf{1}_2$, and second $\mathbf{1}_2$ and third $\mathbf{1}_3$ output signal levels from the sensor 50, and upon the basis of this comparison validates (or rejects) measurements made with the probe. Additionally, the interface determines whether measurements made with the probe are taken upon the basis of outputs generated by the sensors 50 due to a shock wave in the stylus 24 of the probe, or as a result of strain in the stylus 24; as an alternative, measurements may be made only on the basis of strain.

31 Claims, 4 Drawing Sheets

U.S. PATENT DOCUMENTS

| | | | | |
|---|---|---|---|---|
| 4,769,919 | | 9/1988 | Lloyd et al. | 33/558 |
| 4,813,151 | * | 3/1989 | Hajdukiewicz et al. | 33/832 |
| 4,882,848 | * | 11/1989 | Breyer et al. | 33/559 |
| 4,916,339 | * | 4/1990 | Lloyd . | |
| 5,024,003 | * | 6/1991 | Breyer | 33/559 |
| 5,083,379 | * | 1/1992 | Enderle et al. | 33/559 |
| 5,111,592 | * | 5/1992 | Aehnelt et al. | 33/559 |
| 5,228,352 | | 7/1993 | McMurtry et al. | 33/558 |
| 5,295,307 | | 3/1994 | Archer | 33/361 |

FOREIGN PATENT DOCUMENTS

| | | | |
|---|---|---|---|
| 0556574 | * | 1/1993 | (EP) . |
| 2094478 | * | 9/1982 | (GB) . |
| WO94/21983 | * | 9/1984 | (GB) . |
| 61-47502 | * | 3/1986 | (JP) . |
| WO88/01726 | * | 3/1988 | (WO) . |
| 92/09862 | * | 6/1992 | (WO) . |
| 93/09398 | * | 5/1993 | (WO) . |

OTHER PUBLICATIONS

Verkleinerte Kopie einer Fertigungszeichnung mit der Zeichnungsnummer 600660–9009 (3) aus dem Jahre 1983, mit der der Tastkopfverstärker komplett dargestellt wird.

Verkleinerte Kopie einer Fertigungszeichnung mit der Zeichnungsnummer 600660–9008 (2) aus dem Jahre 1983, mit der eine der beiden Leiterplatten des Tastkopfverstärkers dargestellt wird.

Verkleinerte Kopie einer Fertigungszeichnung mit der Zeichnungsnummer 600660–7008.091 (1) aus dem Jehre 1983, mit der der beiden Schaltplan unseres Tastkopfverstärkers dargestellt wird.

Kopie eines Leiferscheins zur Lieferung eines Koordinatenmessterätes vom Typ PMC an die Firma Werner & Pfleiderer GmbH in 7000 Stuttgart–Feuerbach vom 04.03./09.03.1988.

Kopie einer Rechnung für das an die Firma Werner & Pfleiderer GmbH in 7000 Stuttgart–Feuerbach ausgelieferte Koordinatenmessgerät vom Typ PMC vom 11.03.1988.

* cited by examiner

Fig.2
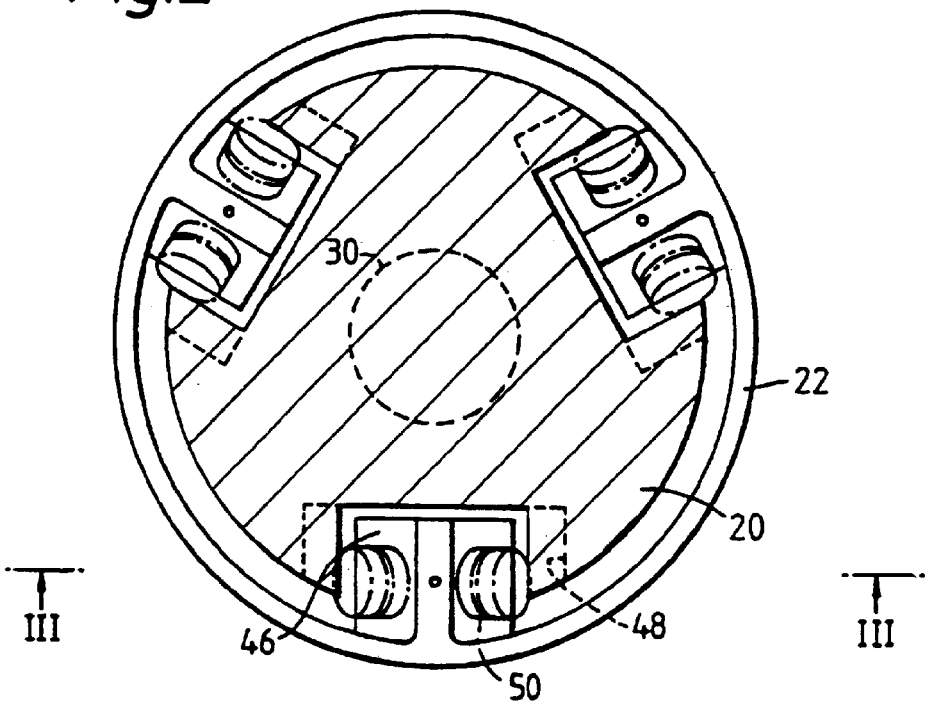
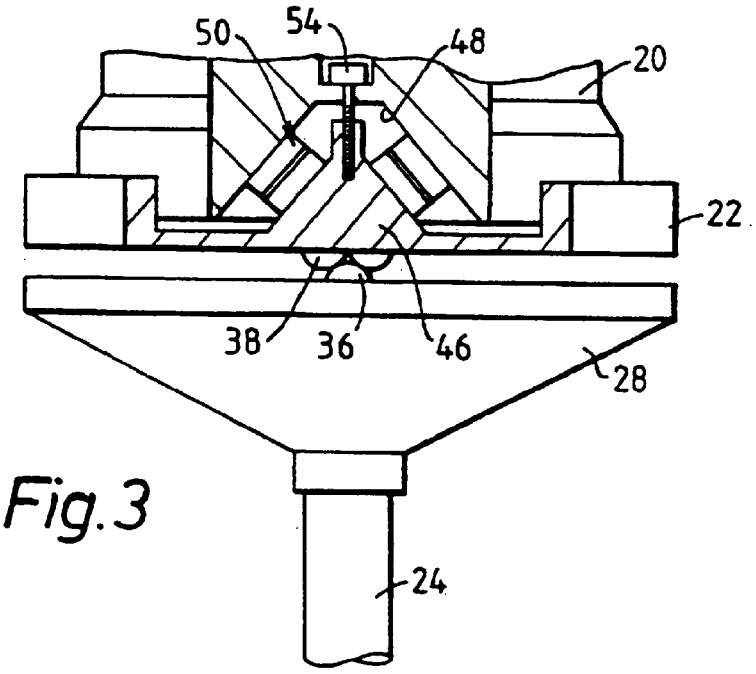
Fig.3

I3
I2
I1
t1
t1'
t2
t3

Shock

Strain

Conf 1

Conf 2

Vcap
Vt

Comparator

Output 100

TOUCH PROBE AND SIGNAL PROCESSING CIRCUIT THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a touch probe, used on a coordinate positioning machine such as a machine tool or coordinate measuring machine to enable the inspection of, for example, the dimensions of machined components, and to a signal processing circuit which acts as an interface between the probe and the control of the machine on which the probe is used. Coordinate positioning machines typically comprise an arm to which the probe is mounted, and which is movable relative to a table on which a component or workpiece to be inspected is supported. The machine includes one or more transducers which measure displacement of the arm from a reference position which is usually fixed relative to the table.

2. Description of Related Art

A known probe includes a fixed structure such as a housing by which the probe is mounted on the arm of the machine, and a stylus supporting member supported relative to the housing in a repeatable rest position, from which the supporting member may be displaced when a deflecting force is applied thereto, and to which it may return when the deflecting force has been removed. Measurements are taken by operating the machine to move the arm until a stylus connected to the supporting member comes into contact with the surface of the part to be inspected, and, upon detecting such contact, taking readings from the transducers of the machine to determine the position of the movable arm relative to the reference position. The probe includes one or more analogue sensors which emit signals indicating contact between the stylus and the surface whose position is to be measured. These sensors may sense displacement of the stylus supporting member relative to the housing, or, in high accuracy probes, the sensors may sense deformation of the stylus and/or the stylus supporting member which takes place before such a displacement occurs. Probes employing displacement or deformation sensors are shown in U.S. Pat. No. 4,153,998 or U.S. Pat. No. 4,177,568 respectively.

Signal processing circuitry, which acts as an interface between the probe and the machine control, emits a step-change, or "trigger" signal when the analogue signal from the sensor inside the probe has attained a predetermined threshold set in the interface. The trigger signal instructs the machine control to determine the position of the movable arm and arrest motion of the arm in order to prevent damage to the machine. A small scale movement of the arm relative to the part to be inspected after contact between the stylus and the surface has occurred, known as "overtravel", is accommodated by the ability of the stylus supporting member to deflect relative to the housing of the probe.

SUMMARY OF INVENTION

A first aspect of the present invention relates to the optimum location of deformation sensors in such a probe. According to a first aspect of the present invention, a touch probe includes a fixed structure, by which the probe may be supported on the movable arm of a coordinate positioning machine, and a stylus supporting member biased into a repeatable rest position relative to the first structure, from which the supporting member is displaceable when a deflecting force is applied thereto, and to which it may return when said deflecting force is removed, the direction of biasing action defining a probe axis, the fixed structure and stylus supporting member forming at least part of a load path between a stylus securable to said stylus supporting member and said movable arm, wherein the probe comprises a plurality of sensors, sensitive to tension and compression for sensing force applied to said supporting member prior to displacement thereof from said rest position, each said sensor having an axis of maximum sensitivity to tension and compression, wherein said sensors are provided in said load path and are grouped into pairs, the axis of maximum sensitivity of each sensor in a pair of sensors being inclined (a) with respect to the probe axis and (b) with respect to the axis of maximum sensitivity of the other sensor in the pair.

In one embodiment, the sensors are provided between two parts of said stylus supporting member. In a further embodiment, the sensors are provided on the fixed structure, and are pre-stressed by the weight of, and/or biasing action on the stylus supporting member.

The deformation sensors may, for example, be provided by strain gauges (and associated load cells), or by piezoelectric sensors. The output from such sensors increases with increased deformation of the stylus and/or the stylus supporting member, up to a maximum value at which displacement of the stylus supporting member relative to the housing occurs. A further independent aspect of the present invention relates to an advantageous configuration of piezoelectric sensor which provides good signal to noise characteristics. According to a further aspect of the present invention, a piezoelectric sensor for sensing tension and compression between two conducting surfaces comprises first and second piezoelectric elements provided between said surfaces, each of which generates a polarisation of electric charge in a direction extending between said surfaces upon tension or compression thereof in said direction, wherein said elements are stacked one upon another and have oppositely directed polarities, the sensor further comprising means for insulating each of said surfaces from said elements, means for equalising the electric potential of said surfaces, a first electrode connected to one of said elements at a point adjacent one of said surfaces, and a second electrode connected to said one element at a point adjacent its abutment with the other of said elements.

This arrangement enables a larger manifestation of the electric charge polarisation, created by e.g. compression of a stack of elements, in the form of a voltage, by minimising the effect of stray capacitance between the electrodes and the surfaces.

A problem which occurs particularly with probes which have analogue sensors indicating deformation of the stylus and/or stylus supporting member, is that vibration of the machine during movement of the movable arm causes the sensors to emit signals whose value exceed the threshold set in the interface, causing the interface to emit a "false" trigger signal (i.e. a trigger when no contact between the stylus and a surface has occurred). To overcome this problem, interfaces have been provided which generate an initial "latching" signal when the signal level from the probe reaches a predetermined threshold, and a subsequent confirmation signal some time later if the signal level from the sensor is still above the threshold. The latching signal causes the machine control to register the position of the movable arm; the confirmation signal validates the "latched" position reading and is also used to arrest movement of the movable arm. An interface of this type is described in U.S. Pat. No. 4,177,568. Machine vibrations causing isolated increases in the analogue signal level above the predetermined threshold thus fail to cause false trigger because the signal output from the analogue sensor does not correspond to the trigger signature required by this interface. However, a machine vibration resulting in the generation of a latching signal may occur sufficiently close to a genuine contact between the stylus and a surface for the confirmation signal emitted by the interface in respect of the genuine measurement event to confirm the validity of the position measurements latched in respect of the analogue signal resulting from the machine vibration; the resulting measurement will thus be the position of the movable arm at which the machine vibration occurred, rather than the position at which the stylus contacted the surface (an event which occurred a very short space of time afterwards).

To overcome this problem, a third independent aspect of the present invention provides an interface for connecting a measuring probe to a control for a machine on which said probe is used, the interface emitting a latching signal when the analogue signal level from the probe attains a first threshold value, and a confirmation signal responsive to a trigger signature from the analogue sensor characterised by at least three successively increasing signal levels, the time interval between attainment of the first and second signal levels determining the requisite time interval between the second and third signal levels. Preferably, the first threshold value of analogue signal corresponds to the signal level required to generate the latching signal.

The interface of the present invention is thus more discriminating, while simultaneously accommodating all conceivable signal profiles occurring as a result of a genuine measurement event. This has particular relevance in relation to measurement operations in which different individual measurements are made at different speeds of the movable arm relative to the part to be inspected. If, for example, the part is inspected at a relatively slow speed, then the time interval between the attainment of the first and second thresholds by the analogue signal will be relatively large. However, since this time interval is used to determine the requisite time interval after which the analogue signal level should be at, or above, the third threshold, the signature of this event will correspond to a trigger signature recognisable by the interface. Conversely, the same will be true for a probing operation which occurs at a relatively fast speed.

Deformation sensors such as strain gauges or piezoelectric elements are typically sensitive to tension and compression over a large range of frequencies. Thus, a probe employing such sensors to detect deformation of the stylus and/or stylus supporting member, will be susceptible to generating analogue signals in excess of a threshold set in the interface responsive to both high frequency deformation, i.e. a shockwave generated upon contact between the stylus and a surface, and low frequency deformation, i.e. strain resulting from contact between the stylus and a surface. Trigger signals generated by the interface in response to these two different types of probe output have different response times, i.e. different time intervals between initial contact of the stylus with the surface, and emission of a latching signal by the interface. This affects the accuracy of measurements made with the probe, since the distance travelled by the movable arm of the machine during the time interval between initial stylus-surface contact and emission of a latching signal by the interface (known as the "pre-travel"), is dependent upon the time interval between these two events. Pre-travel for a given probe/stylus combination is normally calibrated prior to measurement. However, a variation in pre-travel, which occurs if latching signals are generated sometimes as a result of shockwaves and sometimes as a result of strain will result in a measurement error. A fourth independent aspect of the present invention provides an interface which discriminates between signal outputs from the probe resulting from (a) shockwaves generated in the stylus and stylus supporting member when the stylus contacts the workpiece, and (b) strain in the stylus and/or stylus supporting member when a stylus contacts the surface.

Accordingly, a fourth aspect of the present invention provides an interface for connecting a touch probe, having at least one sensor for generating analogue signals, to a control of a coordinate positioning machine, the interface comprising:

means for generating a latching signal, for instructing the machine control to record a measurement, responsive to said analogue signals attaining a predetermined threshold; and means for determining whether said latching signal was generated in response to analogue signals of above a predetermined frequency, and for generating a flag signal accordingly.

The user of the machine is therefore able to determine from the flag signal whether the measurement was taken as a result of a shockwave or as a result of strain, and, consequently, may either assign the appropriate pre-travel to the measurement (where pretravel calibration values have been obtained in respect of both shock and strain), or where e.g. the shockwave was not present, perform a further measurement operation to attempt to obtain a measurement value on the basis of a shockwave.

In an alternative form of interface, latching signals are not generated when analogue signals in excess of the predetermined threshold have a frequency in excess of the predetermined frequency, i.e. the shockwave is ignored.

BRIEF DESCRIPTION OF DRAWINGS

An embodiment of the invention will now be described, by way of example, and with reference to the accompanying drawings in which:

FIG. 2 shows a section on II—II in FIG. 1;

FIG. 3 shows a section on III—III in FIG. 2;

DESCRIPTION OF PREFERRED EMBODIMENTS

Figure 1:
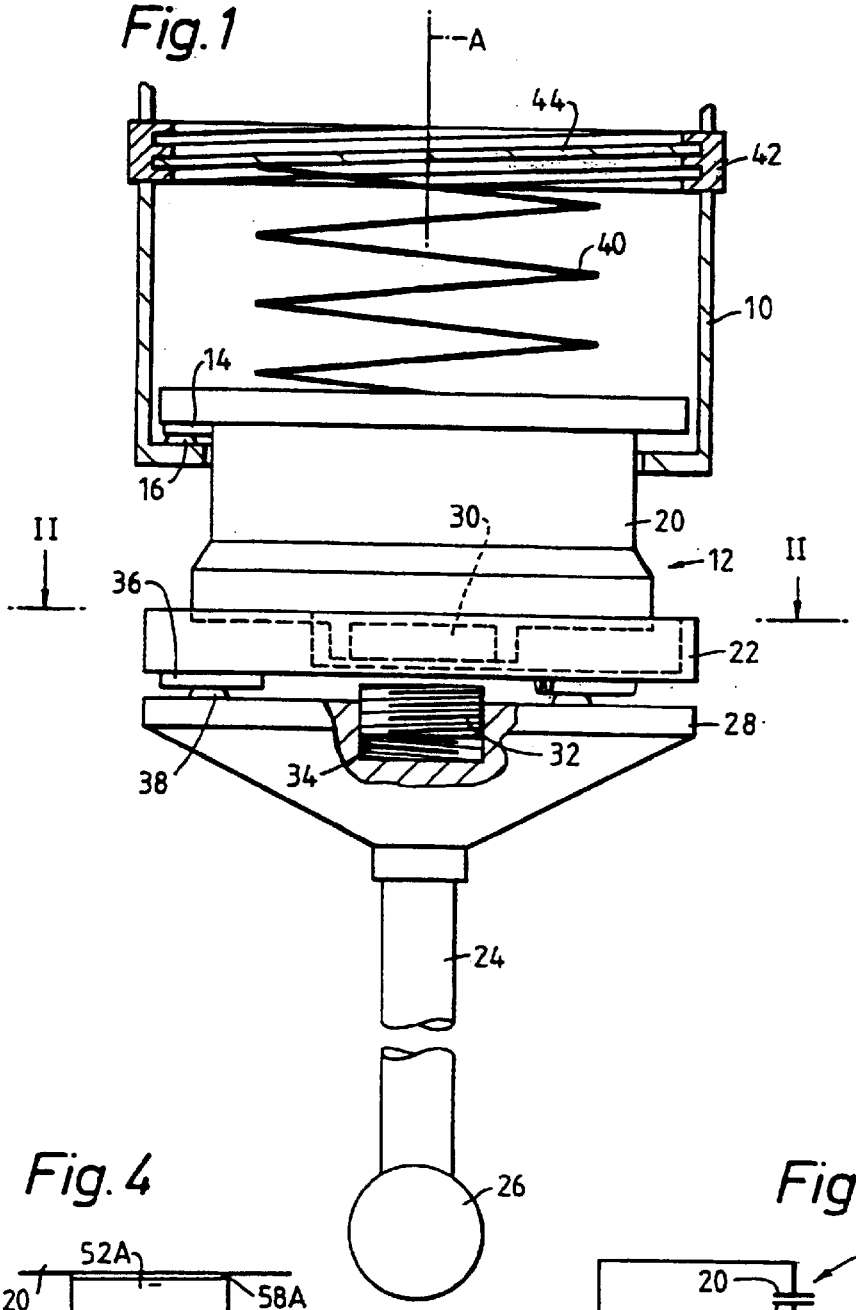
FIG. 1 shows a section through a probe according to the present invention.

Referring now to FIG. 1, a touch probe which employs a number of analogue sensors will now be described. The probe includes a fixed structure provided by a cylindrical housing 10, which defines an axis A, and a stylus supporting member 12 supported in a kinematic rest position with respect to the housing 10 provided by the engagement of rollers 14 on the supporting member 12 with pairs of balls 16 on the housing 10. A support of this type enables displacement of the supporting member 12 from the rest position when deflecting force is applied thereto, and return of the supporting member 12 to the rest position when the deflecting force is removed. It is not essential to use a kinematic support for the stylus supporting member 12, other types of support mechanism which provide repeatable location of the supporting member 12 relative to the housing 10 may be used such as those described in GB 2094478.

The stylus supporting member 12 consists of an upper body 20 and a lower body 22 which supports a stylus 24, having a spherical sensing tip 26 at its remote end. The stylus 24 is mounted on a circular retaining plate 28. The retaining plate 28 is magnetically urged into engagement with the lower body 22 by means of the magnetic interaction between a permanent magnet 30 supported on the upper body 20 with a steel striker plate 32 provided on the retaining plate 28. The magnetic attraction force between the lower body 22 and the retaining pate 28 may be adjusted by altering the position of the plate 32 within the screw-threaded bore 34 provided in the retaining plate 28.

Location of the retaining plate 28 relative to the lower body 22 is provided by a further kinematic support; three pairs of radially extending rollers 36 being provided on the lower body which are respectively engaged by three balls 38 provided on the retaining plate 28. The rollers 36 are included in a series electrical circuit in order to detect this engagement of the retaining plate 28, or, alternatively (depending upon the length of the stylus and the magnetic attraction), deflection of the retaining plate 28 relative to the lower body 22 to accommodate overtravel during a measurement. The magnetic mounting of the stylus 24 on the lower body 22 enables automatic exchange of styli, for example in the manner described in our earlier filed International patent application PCT/GB92/02070. The automatic exchange of styli enables the mounting of different configurations of styli on the probe, in order to inspect differently oriented surface of a part.

The stylus 24 is thus supported on the movable arm of the machine by a load path which includes the lower and upper bodies of the stylus supporting member 12, and the housing 10. Thus all forces applied to the stylus 24, prior to displacement of the supporting member 12 from its rest position, will be transmitted through this load path.

Biasing of the stylus supporting member 12 into the rest position with respect to the housing 10 is provided by a biasing spring 40. The biasing force applied by the spring 40 acts parallel to axis A, and may be adjusted by rotation of a rotatable collar 42 mounted on the housing 10. The collar 42 has, at its inner side, a screw-threaded engagement with a plate 44 which provides an abutment for the spring 40. Rotation of the collar 42 relative to the housing 10 results in axial movement of the plate 44 and a consequent change in the biasing force applied by the spring 40 to the supporting member 12.

Referring now additionally to FIG. 2 and 3, the lower body 22 of the stylus supporting member 12 is formed as a circular dish having three upwardly directed, radially extending v-shaped ridges 46. The upper body 20 has, in its lower surface, three correspondingly arranged radially extending u-shaped channels 48 which receive the ridges 46. An analogue sensor in the form of a stack 50 of piezoelectric elements 52 is mounted between each of the inclined surfaces on each of the ridges 46 and the corresponding sides of each of the u-shaped channels 48. The stacks 50 of elements 52 are compressed by clamping bolts 54, which clamp the upper and lower bodies 20,22 together. As can be seen in FIG. 2, the stacks 50 of elements are grouped in pairs at three points about the axis A. The direction of electric charge polarisation of each piezoelectric element 52 in a stack 50 extends substantially perpendicular to the surfaces of the upper and lower bodies 20,22 against which the elements are compressed and thus is inclined both with respect to the probe axis A, and with respect to the direction of electric polarisation of the adjacent stack 50 in a given pair. Such a configuration provides optimum sensitivity to forces applied to stylus 24 in a wide range of directions.

Figure 4:
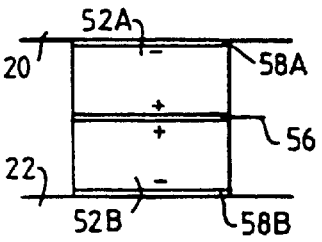
FIGS. 4 shows a detail of FIG. 3.

Referring now to FIG. 4, an individual stack 50 of piezoelectric elements 52 consists of first and second elements 52A,B, a positive electrode 56 spaced between the elements 52, and two negative electrodes 58A,B spaced between each element and the upper or lower body 20,22 respectively. The polarity of the elements 52A,B is arranged so that they will generate oppositely directed electrical charge polarisations upon tension or compression. The electrodes 58A,B are insulated from the upper and lower bodies 20,22, in this example, by an anodising layer; bolts 54 which connect the upper and lower bodies 20,22 ensure that the bodies remain at the same potential. The output signals are taken from the element 52B, via electrodes 56 and 58B. As will be described, element 52A serves to reduce the effect of stray capacitance, between electrode 56 and the upper body 20 for example.

Figure 5:
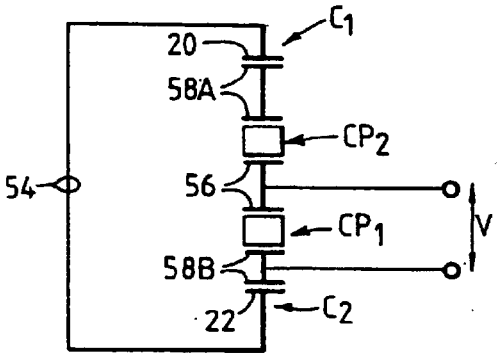
FIG. 5 is a circuit diagram for the detail of FIG. 4.

When the stack 50 is compressed, each of the elements 52A,B will generate an electric charge polarisation Q. This charge polarisation Q manifests itself as a potential difference V across a capacitor, with V being equal to Q/C, where C is the capacitance. Thus, the lower the effective capacitance of a system of this type, the higher the output voltage for a given charge polarisation (and therefore for a given compressing force) i.e. the higher the sensitivity of the system. Referring now to FIG. 5, the capacitance provided by piezoelectric element 52B, and electrodes 56 and 58B is denoted as $C_{p1}$; the capacitance provided by the element 52A and electrodes 56 and 58A is denoted $C_{p2}$. Stray capacitances $C_1$ and $C_2$ are the result of the capacitances between electrodes 58A and 58B, and upper and lower bodies 20,22 respectively. Upon compression (e.g.) of a stack 50 a positive charge will appear at electrode 56 and negative charges will appear at electrodes 58A,B. In the absence of element 52A, (i.e. $C_{p2}$), parts of the charge at electrodes 56 and 58B would migrate to stray capacitances $C_1$,$C_2$, thus reducing the output voltage across electrodes 56,58B (and hence the magnitude of the detectable signal). However, because electrode 58A is at the same potential as electrode 58B, and the upper and lower bodies are at the same potential by virtue of bolts 54, no charge is taken up by capacitors $C_1$,$C_2$, and the entire electric charge polarisation in element 52B is converted to a voltage across electrodes 56,58B.

Figure 6:
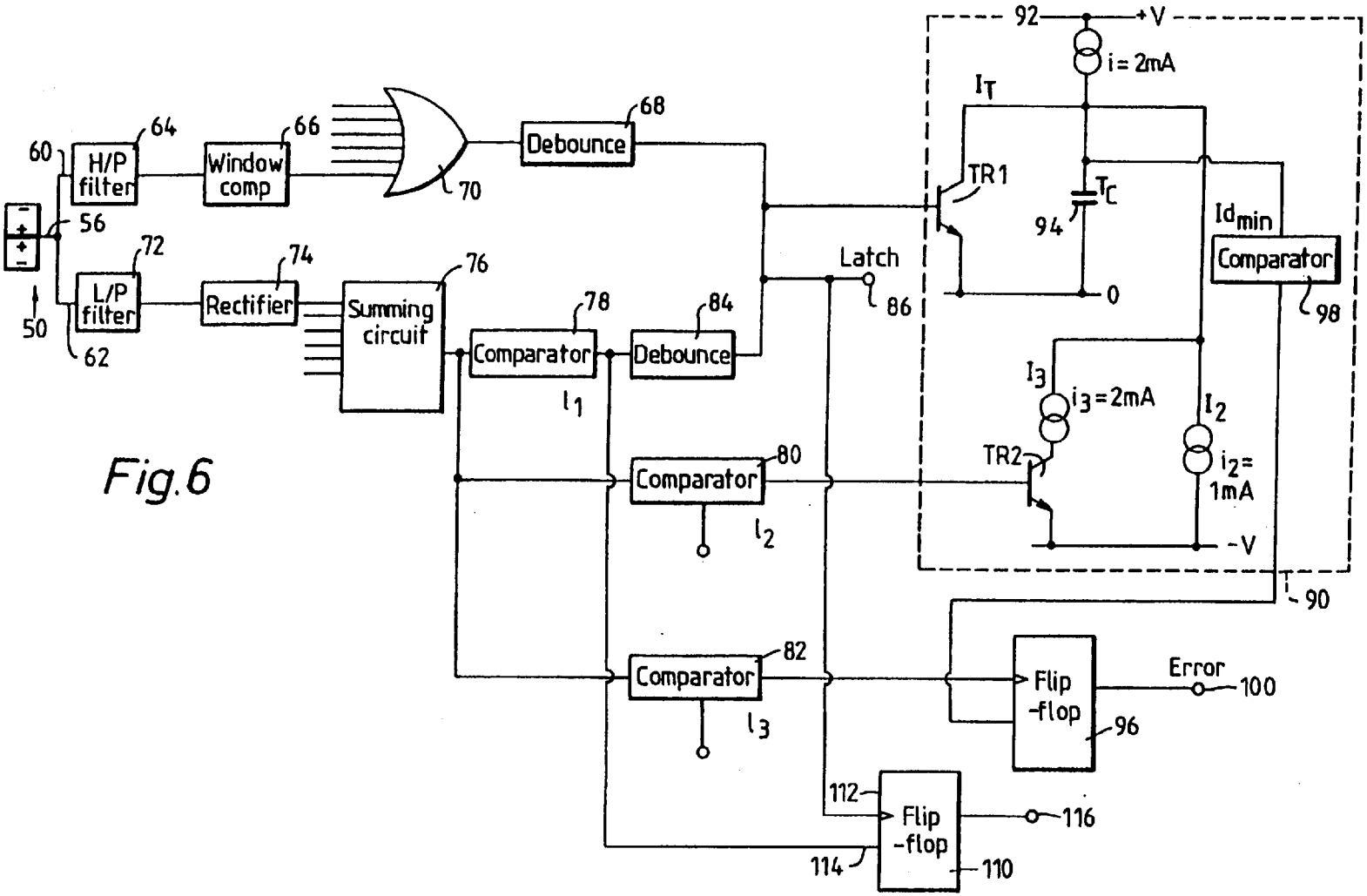
FIG. 6 is a circuit diagram showing an embodiment of interface according to the present invention; and FIGS. [7a–n] *7a–h* are signal diagrams illustrating the operation of an interface according to the present invention.

Usually, when the sensing tip 26 of the stylus 24 contacts the surface of a part to be inspected, a shockwave is generated which travels up the stylus 24 and causes a high frequency voltage oscillation, or "ringing", in the output of the piezoelectric elements 52. Occasionally however, as a result of grease or other contaminants on the surface of the part, this shock wave is not present and the earliest indication of contact between the sensing tip 26 and a surface is the steady increase in voltage caused by strain in the stack 50 of piezoelectric elements 52 as a result of a microscopic movement of the stylus 24, retaining plate 28 and lower body 22 of the stylus supporting member relative to the upper body 20. To detect each of these type of output signals, an interface (shown in FIG. 6) is provided which has, in respect of each stack 50, a high frequency channel 60, and a low frequency channel 62. The high frequency channel 60 includes a high-pass filter 64, having a lower cut-off frequency of 500 Hz, in series with a window comparator 66 set at a threshold level $\mathbf{1}_1$. The outputs of each of the six high frequency channels 60 are OR'd together and passed through a debounce circuit 68, which generates a high output when the output of the OR gate 70 is high, but does not return to the low voltage state until some time after the last low output of the OR gate 70. The low frequency channel 62 includes a low-pass filter 72, having an upper cut-off frequency of 200 Hz, in series with a rectifier 74. The outputs of each of the low frequency channels 62 are sent to a summing circuit 76 whose output is then connected in parallel to three comparators 78,80,82, set at three threshold levels: $\mathbf{1}_1$, $\mathbf{1}_2$, and $\mathbf{1}_3$. The output of comparator 78 is connected in series to a further debounce circuit 84; debounce circuits are not required in respect of comparators 80 and 82 because the thresholds $\mathbf{1}_2$ and $\mathbf{1}_3$ are set at sufficiently high level.

Figures 7A, 7B, 7C, 7D, 7E, 7F, 7G, 7H:
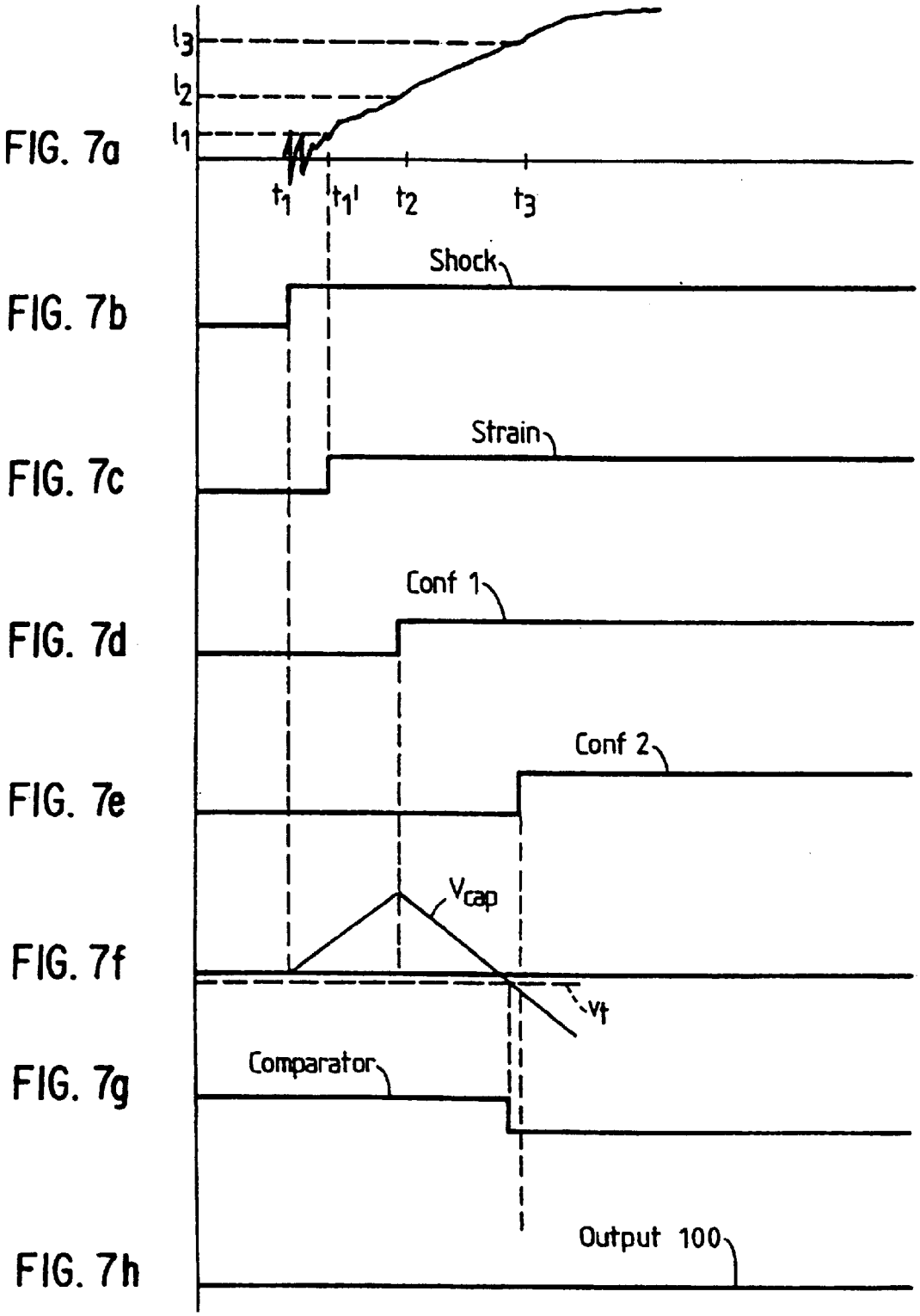

FIG. 7a illustrates the output from the positive electrode 56 of a piezoelectric stack 50. From the signal diagram it can be seen that the threshold level $\mathbf{1}_1$ is first attained at a time $t_1$, and as a result of the high frequency voltage oscillation generated by the shock wave upon initial contact of the sensing tip 26 with the surface. The instant at which the output of the debounce circuit 68, in the high frequency channel 60 of the interface, goes high thus corresponds to the time $t_1$ at which the level $\mathbf{1}_1$ is attained at window comparator 66, and this is illustrated in FIG. 7b. As the shock wave is attenuated, and the high frequency oscillations are correspondingly damped, the probe continues to move relative to the surface of the part. This causes a steady increase in the strain in the piezoelectric stack 50, and corresponding steady increase in the voltage output from the electrode 56. At a time $t'_1$, the threshold level $\mathbf{1}_1$ is once again attained as a result of this steady increase in voltage, and the output of the debounce circuit 84, provided in respect of the low frequency channels 62, goes high; this is illustrated in FIG. 7c. The outputs of both debounce circuits 68 and 84 are combined at a LATCH output terminal 86, which is sent to the machine control, and instructs the machine control upon receipt of an output signal at this terminal to register the position of the movable arm of the machine. As is mentioned above, the shock wave generated by initial contact between the sensing tip 26 and the surface of the part is not always present. The output of debounce circuit 68 cannot therefore be reliably used to provide the latching signal at output terminal 86. It is for this reason that the outputs of the high and low channels 60,62 are combined at output 86.

In order to provide confirmation that the latching signal generated at output 86 represents a genuine contact between the sensing tip 26 and the workpiece, rather than the generation of a voltage which exceeds the threshold level $\mathbf{1}_1$ as a result of vibration of the machine, comparators 80 and 82, and a timing circuit 90 are provided to enable the interface to respond only to signal profiles which closely mimic a genuine trigger signature from the stacks 50.

The timing circuit 90 includes a supply rail 92 to which a 2mA constant current source $i_1$ is connected, which is in turn connected in series with a capacitor 94. The capacitor 94 is connected in parallel with a transistor TR1. Constant current source $i_1$ is also connected in series to a 1mA constant current source $i_2$, which in turn is connected in parallel with a second 2mA current source $i_3$. The constant current source $i_3$ is connected in series with a transistor TR2. The base of transistor TR1 is connected in parallel with the output signal 86, and the base of transistor TR2 is connected to the output of comparator 80.

In normal operation, when no signals are generated from the piezoelectric stack 50 the transistor TR1 is switched on, and the transistor TR2 is switched off. However, upon generation of a latching signal at output 86, the transistor TR1 is switched off. This causes the capacitor 94 to be charged with a current ($I_c$) of 1mA. The voltage $V_{cap}$ across the capacitor 94 is illustrated in FIG. 7f, and it can be seen from this Figure that the voltage rises linearly. When continued movement of the movable arm of the machine relative to the part to be inspected increases the strain in the piezoelectric stack 50 to such an extent that the output voltage from the stack 50 attains the threshold level $\mathbf{1}_2$, the comparator 80 outputs a step signal CONF1 (illustrated in FIG. 7d) which switches the transistor source $i_3$; the current $I_c$ now being equal to −1mA. The TR2 on. This causes the capacitor 94 to discharge, in voltage $V_{cap}$ now decreases linearly. Further movement of order to satisfy the requirements of the constant current the probe relative to the workpiece, causing further strain in the piezoelectric stack 50, will result in a further increase in the voltage output from the stack to a level above the threshold level $\mathbf{1}_3$. This will cause the comparator 82 to emit a signal CONF2 (illustrated in FIG. 7e), which latches, by means of a D-type flip-flop 96, the output of a comparator 98. Comparator 98 compares the voltage $V_{cap}$ to a predetermined threshold voltage $V_t$; the output of the comparator being high unless the voltage $V_{cap}$ lies below the voltage threshold $V_t$. An error signal is thus generated at output terminal 100 of the flip-flop 96 if, at the time signal CONF2 is generated, the voltage $V_{cap}$ exceeds the threshold voltage $V_t$ when the voltage from the piezoelectric stack 50 passes through the threshold level 13 (in FIG. 7 no such error signal is generated).

This situation arises when the time interval between the attainment of the threshold voltage levels $\mathbf{1}_2$ and $\mathbf{1}_3$ does not correspond to the time interval between the attainment of the levels $\mathbf{1}_1$ and $\mathbf{1}_2$; in other words, where the initial latching signal at output 86, caused by high frequency ringing or a small strain in the piezoelectric stack 28, occurs a relatively long period of time before the strain in the piezoelectric stack 50 increases to the level $\mathbf{1}_2$, but where the rate of increase of strain is such that the level $\mathbf{1}_3$ is attained a relatively short time after the level $\mathbf{1}_2$. The are two possible reasons for this: firstly, it is possible that the movable arm of the machine was moving at a relatively slow speed when initial contact was made with the surface, thus explaining the relatively large time interval between attainment of the threshold levels $\mathbf{1}_1$ and $\mathbf{1}_2$. A subsequent acceleration of the machine would result in an increased rate of compression of the piezoelectric stack 50, causing a corresponding increase in the rate of increase of the output voltage, thereby decreasing the time interval between the voltage passing through threshold levels $\mathbf{1}_2$ and $\mathbf{1}_3$. Alternatively, if the movable arm was travelling at a constant speed relative to the surface of the part, a vibration of the movable arm resulting in the generation of a latching signal at output 86, which occurred a short period of time before contact between the sensing tip 26 of the stylus and the surface of the part, would cause the capacitor 94 to start charging too early. The time interval between attainment of the voltage levels $\mathbf{1}_2$ and $\mathbf{1}_3$ would thus be insufficient for the capacitor to lose enough charge for the voltage level $V_{cap}$ to pass below the threshold level $V_t$.

The interface of the present invention thus operates by discriminating genuine trigger signatures from the piezoelectric stack 50 on the basis of a correspondence in the time intervals between the attainment of threshold levels $\mathbf{1}_1$ and $\mathbf{1}_2$, and the levels $\mathbf{1}_2$ and $\mathbf{1}_3$. A result of this is that the interface is insensitive to variations in probing speed from one probing operation to the next; it is, however, a requirement that each individual probing operation is made under constant speed. For example, if the measurement is taken at a relatively slow speed, the strain in the piezoelectric stack 50 will increase at a relatively low rate as will the output voltage. Because the probe is moving at a constant speed, the voltage will increase at a substantially constant level, and therefore the relatively large time interval between attainment of the voltage thresholds $\mathbf{1}_1$ and $\mathbf{1}_2$ will be balanced by correspondingly large time interval between attainment of the voltage thresholds $\mathbf{1}_2$ and $\mathbf{1}_3$. The converse is true for a probing operation occurring at a relatively fast speed.

The relative values for the capacitance of capacitor 94, and the value of the constant current sources are determined by the characteristics of the piezoelectric stacks 50; and the absolute value of the capacitor 94 is chosen with regard to practical opening voltages for the comparator 98.

The peak output voltage from the piezoelectric stack 50 corresponds to the instant in time at which the stylus supporting member 12 is displaced from its kinematic rest position with respect to the housing. At this instant in time, a HALT signal is emitted from a further circuit (not shown) in the interface, which incorporates the serial connection of each of the rollers 14 ad balls 16. The HALT signal is emitted when the resistance in the aforementioned circuit reaches a predetermined threshold (such a circuit is shown in, e.g. W092/09862), and is used to instruct the machine control to arrest movement of the movable arm. The small movement or "over-travel" of the movable arm after the sensing tip 26 has come into contact with the surface of the part to be inspected is accommodated by the ability of the stylus supporting member 12 to be displaced from its rest position relative to the housing 10.

During the time period between contact of the surface of the part by the sensing tip 26 of the stylus 24, and the instant of time at which the LATCH signal from terminal 86 causes the machine to register the position of the movable arm, the probe (and thus the movable arm) will move relative to the part. This movement is known as "pre-travel", and in order to obtain an accurate measurement of the position of the surface relative to a reference position on the machine it is necessary to calibrate or "datum" the magnitude of the pre-travel. Such calibration procedures are well known. However, in a probe of the present type the LATCH signal at output terminal 86 may result from analogue signals generated in the piezoelectric elements as a result of two different physical phenomena; the LATCH signal at output terminal 86 may be generated as a result of a voltage from the piezoelectric stack 50 cad by a shock wave occurring as a rest of the impact between the stylus tip 26 and the surface of the part to be inspected; alternately, it is possible that the shock wave may not be present, in which case the LATCH signal at output terminal 86 will be generated as a result of the steady increase in compression of the piezoelectric stack 50 after initial contact of the tip 26 with the surface of the part, caused by continued movement of the movable arm (and thus the probe) relative to the surface. As can be seen from FIGS. 7b and 7c, the LATCH signal will occur at different instances in time depending upon whether the shock wave was present or not. Because the pre-travel of the probe is related directly to the time delay between the instant of contact of the sensing tip 26 with the surface and the moment at which the machine registers the position of the movable arm, measurements resulting from a LATCH signal caused by the shock wave will have a different pre-travel to measurements resulting from a LATCH signal generated upon the basis of an increase in the strain in the stack 50. For improved accuracy therefore, it is necessary to determine whether the LATCH signal is generated as a result of a shock or as a result of strain. The probe may then be calibrated so that a pre-travel value is obtained for LATCH signals generated by shock, and a further pre-travel value is obtained for LATCH signals generated by strain.

Referring again to FIG. 6, a D-type flip-flop 110 has its clock input 112 connected to the output terminal 86 and its data input 114 connected to the output of comparator 78 provided in respect of the low frequency channel 62. The LATCH signal generated at output terminal 86 thus performs a clock function at the input 112, switching the data input 114 on to the output line 116 of the flip-flop 110. If the LATCH signal is generated as a result of shock in the stylus 24, then, when the LATCH signal is sent to the clock input 112 the data input 114 of the flip-flop 110 will be low, since the level of strain in the low frequency channel 62 will not yet be high enough to cause the output of comparator 78 to go high. The signal level on output line 116 of the flip-flop 110 will thus be low, indicating that the trigger was caused by shock in the stylus 24. Alternatively, if the LATCH signal is generated as a result of strain, then the output of comparator 78 will be high at the instant the LATCH signal is generated, causing the LATCH signal at clock input 112 to switch a high signal on data line 114 to the output 116; a high output signal on line 116 thus indicates that the LATCH signal is generated as a result of strain.

In a modification, the interface may be adapted to ignore signals from the piezo stacks 50 in excess of a certain frequency, e.g. by providing a switch which switches off channel 60, thereby triggering only by signals generated by strain.

The present invention has been described with reference to the use of piezoelectric elements as analogue sensors which detect deformation of the stylus and stylus supporting member before movement of the stylus supporting member 12 relative to the housing 10. Alternative analogue sensors may be used for this purpose, one example being strain gauges and an associated load cell. Additionally, an electrical circuit has been shown as an example of an analogue sensor which detects displacement of the stylus supporting member relative to the housing 10; alternative such analogue sensors may be employed, such as capacitive sensors or optical sensors employing photodiodes or position sensitive detectors.

We claim:

1. A touch probe having a fixed structure and a stylus supporting member biased into a repeatable rest position relative to the fixed structure, from which the supporting member is displaceable when a deflecting force is applied thereto, and to which the supporting member may return when said deflecting force is removed, a direction of biasing action defining an axis, the probe further comprising a plurality of sensors sensitive to tension and compression, for sensing force applied to said supporting member prior to displacement thereof from said rest position, said sensors being clamped between first and second parts of said stylus supporting member and each of said sensors having an axis of maximum sensitivity to tension and compression, said sensors being grouped into pairs, the axis of maximum sensitivity of each of said sensors being inclined (a) with respect to the probe axis and (b) with respect to the axis of maximum sensitivity of the other sensor in each of said pairs, one of said first and second parts of said stylus supporting member comprising a plurality of V-shaped rides extending radially with resect to said probe axis, and each of said pairs including a sensor located on opening faces of said ridges.

2. An interface circuit for connecting a touch probe, having at least one analogue sensor for generating an analogue signal, to a control of a coordinate positioning machine, the interface comprising:

means defining first, second, and third analogue signal levels;

means for comparing the time interval between attainment of said first and second, and said second and third signal levels, and determining upon the basis of said comparison whether said analogue signal conforms to a predetermined trigger signature; and means for generating a trigger output responsive to said analogue signal conforming to said predetermined trigger signature.

3. An interface circuit according to claim 2 further comprising means for generating a latching signal, instructing the machine control to store the position of the movable arm, when said analogue signal attains said first level.

4. A method of processing an analogue output signal from a touch probe, the method comprising the steps of:

defining first, second and third analogue signal levels;

determining the magnitude of a first time interval between attainment of said first and second analogue signal levels, and determining the magnitude of a second time interval between attainment of said second and third analogue signal levels;

comparing the magnitude of said first and second time intervals;

on the basis of the result of said comparison, generating a trigger output signal.

5. An interface circuit for connecting a touch probe to a control of a coordinate positioning machine, the interface comprising:

latching means for generating a latching signal, for instructing the machine control to record a measurement, in response to an amplitude of at least one analogue signal generated by said interface circuit attaining a predetermined amplitude threshold, said latching means being responsive to said at least one analogue signal having a frequency above or below a predetermined frequency threshold; and means for determining whether said latching signal was generated in response to said at least one analogue signal having a frequency above said predetermined frequency threshold, and for generating a flag signal accordingly.

6. An interface circuit according to claim 5 wherein said predetermined threshold of frequency is 500 Hz.

7. An interface according to claim 5, further comprising means for determining whether said at least one analogue signal conforms to a predetermined trigger signature, and for generating a confirmation signal accordingly.

8. An interface according to claim 7, comprising means for determining whether, at a given instant of time after the emission of said latching signal, the amplitude of said at least one analogue signal exceeds said predetermined amplitude threshold.

9. An interface for connecting a touch probe to a control of a coordinate positioning machine, the probe having at least one sensor for generating at least one analogue signal, the interface comprising:

latching means for generating a *first* latching signal, for instructing the machine control to record a measurement, in response to an amplitude of said at least one analogue signal attaining a predetermined amplitude threshold, said latching means being responsive to said at least one analogue signal having a frequency above or below a predetermined frequency threshold;

[discriminating] *determining* means for determining whether said latching signal was generated in response to said at least one analogue signal having a frequency above said predetermined frequency threshold, and for generating a flag signal accordingly; and suppressing means for suppressing *the* emission of [said] *a second* latching signal [in the event that said discriminating means determines that said at least one] *which is generated in response to said at least one* analogue signal [attaining said] *having a frequency above the* predetermined amplitude threshold [has a frequency in excess of said predetermined frequency threshold], said suppressing means being selectively operable.

10. An interface circuit according to claim 9 wherein said predetermined frequency threshold is 500 Hz.

11. An interface circuit for connecting a probe to a control of a machine, the probe having at least one analogue sensor, the interface comprising:

at least one input channel, responsive to signals above and below a predetermined frequency threshold, which receives an input signal from said at least one analogue sensor, said at least one input channel comprising a comparison circuit which generates an output signal when an amplitude of the input signal exceeds a predetermined amplitude threshold; and a frequency discriminator which determines whether the output signal from the comparison circuit occurred in response to an input signal having a frequency greater than said predetermined frequency threshold, and which generates a flag signal accordingly.

12. An interface according to claim 11, further comprising a trigger signal discriminator which determines whether said at least one analogue signal corresponds to a predetermined trigger signature, and which generates a confirmation signal accordingly.

13. An interface according to claim 12, wherein said trigger signal discriminator includes a comparator circuit which generates a step output signal in the event that an amplitude of said at least one analogue signal exceeds a predetermined threshold at a given instant of time after the emission of said latching signal.

14. An interface circuit for connecting a probe to a control of a machine, the probe having at least one analogue sensor, the interface comprising:

at least one input channel, responsive to signals above and below a predetermined frequency threshold, which receives [an] *a first* input signal from said at least one analogue sensor, said at least one input channel comprising a comparison circuit which generates [an] *a first* output signal when an amplitude of the input signal exceeds a predetermined amplitude threshold; *and*

[a frequency suppressor which suppresses] *means for suppressing* the emission of [said] *a second* output signal [in the event that said] *which is generated in response to a second* input signal [has] *having* a frequency greater than said predetermined frequency threshold[; and a selector enabling selective operation of said frequency suppressor], *the suppressing means being selectively operable.*

15. An interface circuit for connecting a probe to a control of a machine, the probe having at least one analogue sensor, the interface comprising:

at least one input channel which receives an input signal from said at least one analogue sensor, said at least one input channel comprising first, second, and third comparators which generate first, second and third output signals when the input signal exceeds first, second and third predetermined thresholds, respectively; and a timing circuit which receives said first, second, and third output signals, and determines whether the time intervals between the occurrence of the first and second input signals and the occurrence of the second and third input conforms to a trigger signature of said probe, the timing circuit further generating a trigger output signal on the basis of the determination.

*16. An interface circuit for processing signals generated by at least one analogue sensor in a touch probe, and providing output signals which are useable by a control of a coordinate positioning machine, the interface comprising:*

*at least one input channel for receiving signals from the analogue sensor,*

*three threshold detectors, each of which generates an output signal when the analogue signal from the sensor reaches a given threshold amplitude,*

*a discriminating circuit which is connected to each of the threshold detectors and which receives their output signals, the discriminating circuit determining whether time intervals between signal emissions from the detectors are representative of a genuine measurement event.*

*17. An interface according to claim 16, having two input channels for receiving the analogue signals, each input channel having a filter, and the two filters transmitting analogue signals of different frequencies, wherein one of the channels has at least two threshold detectors.*

*18. An interface according to claim 17, further including a third input channel which receives a resistance signal corresponding to the resistance of an electrical contact within the probe, the third input channel having a further threshold detector which generates an output signal when the resistance of the electrical contact reaches a given threshold.*

*19. An interface according to claim 17, further including means for producing an output that is indicative of which channel a first occurring output signal was generated.*

*20. An interface for connecting analogue sensors in a touch probe to a control of a coordinate positioning machine, the interface having:*

*a pair of input channels, one for relatively high frequency sensor signals and one for relatively lower frequency sensor signals;*

*at least two comparators in one of the input channels, each of which is set to respond to a different amplitude of sensor signal, and a further comparator in the other input channel; and*

*discriminating circuitry connected to the at least two comparators and the further comparator which determines, from time intervals separating occurrences of output signals from the comparators, whether the output signals represent a genuine measurement event.*

*21. An interface according to claim 20, having three such comparators in said one of the input channels.*

*22. An interface according to claim 20, further including means for producing an output that is indicative of which of the two input channels a first occurring comparator output signal was generated.*

*23. An interface according to claim 22, further including a third input channel which receives a resistance signal corresponding to the electrical resistance of an electrical contact in the probe, the third input channel having a further comparator which is set to respond to the resistance of the electrical contact reaching a threshold level.*

*24. An interface for connecting analogue sensors in a touch probe to a control of a coordinate positioning machine, the interface having:*

*two input channels which are connected to receive sensor signals from the sensors, each channel having a filter wherein the two filters pass sensor signals of a different frequency, and each of the two channels having at least one threshold detector connected to the corresponding filter, which generates a threshold output when the sensor signal exceeds a threshold amplitude; and a circuit connected to the outputs of each of the threshold detectors, which produces an output that is indicative of the channel in which a first occurring threshold output was generated.*

*25. An interface according to claim 24, further including a discriminating circuit which is connected to each of the threshold detectors and which receives their output signals, the discriminating circuit determining whether time intervals between signal emissions from the detectors are representative of a genuine measurement event.*

*26. An interface according to claim 25, having at least two threshold detectors in one of the input channels.*

*27. An interface according to claim 26, further including a third input channel which receives a resistance signal corresponding to the resistance of an electrical contact within the probe, the third input channel having a further threshold detector which generates an output signal when the resistance of the electrical contact reaches a given threshold.*

*28. An interface for connecting analogue sensors in a touch probe to a control of a coordinate positioning machine, the interface having:*

*at least three comparators connected to the analogue sensors, which receive signals from the sensors, and which are each set to respond to a different amplitude of signal; and*

*discriminating means to which the comparators are connected, for receiving output signals from the comparators, and determining on the basis of time intervals between outputs of each of the comparators whether the outputs represent a genuine measurement event.*

*29. An interface according to claim 28, having two input channels, a first of which has a filter transmitting relatively high frequency sensor signals, and a second of which has a filter transmitting relatively low frequency sensor signals.*

*30. An interface according to claim 29, further including a circuit connected to the comparators, which produces an output that is indicative of the channel in which a first occurring comparator output was generated.*

*31. Apparatus for use on a coordinate positioning machine including:*

*a touch probe having a housing and a stylus connected to a supporting member within the housing, the probe including at least one analogue sensor sensitive to tension and compression which generates an analogue signal; and*

*an interface circuit which connects the probe to a control of a coordinate positioning machine, the interface circuit having:*

*a high frequency input channel connected to the analogue sensor, and having a filter which transmits signals from the analogue sensor generated as a*

*result of shock in the stylus when the stylus contacts a workpiece, the high frequency input channel also having a first comparator for generating a first output signal when the amplitude of the analogue signal at the first comparator exceeds a predetermined threshold;*

*a low frequency input channel connected to the analogue sensor, and having a filter which transmits signals from the analogue sensor generated as a result of strain in the stylus when the stylus contacts a workpiece, the low frequency input channel also having a second comparator for generating a second output signal when the amplitude of the analogue signal at the second comparator exceeds a predetermined threshold; and*

*means for determining whether, when the second comparator generates an output signal, an output signal has been generated from the first comparator.*

* * * * *